US012119729B2

(12) United States Patent
Faverolle et al.

(10) Patent No.: US 12,119,729 B2
(45) Date of Patent: Oct. 15, 2024

(54) INTERCONNECTIONS, SENSORS AND CONTROL ELECTRONICS MOUNTED ON A PLASTIC BEARING OF AN ELECTRIC MACHINE

(71) Applicant: VALEO EQUIPEMENTS ELECTRIQUES MOTEUR, Creteil (FR)

(72) Inventors: Pierre Faverolle, Creteil (FR); Khadija El Baraka, Creteil (FR); Svetislav Jugovic, Creteil (FR); Othmane Ouazzani Jamil, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 353 days.

(21) Appl. No.: 17/621,100

(22) PCT Filed: Jun. 29, 2020

(86) PCT No.: PCT/EP2020/068301
§ 371 (c)(1),
(2) Date: Dec. 20, 2021

(87) PCT Pub. No.: WO2020/260715
PCT Pub. Date: Dec. 30, 2020

(65) Prior Publication Data
US 2022/0352784 A1    Nov. 3, 2022

(30) Foreign Application Priority Data

Jun. 27, 2019   (FR) .................................... 19 07018

(51) Int. Cl.
*H02K 5/22*  (2006.01)
*H02K 3/50*  (2006.01)
(Continued)

(52) U.S. Cl.
CPC ............... *H02K 5/225* (2013.01); *H02K 3/50* (2013.01); *H02K 5/1732* (2013.01); *H02K 11/21* (2016.01); *H02K 11/25* (2016.01); *H02K 11/27* (2016.01)

(58) Field of Classification Search
CPC ........ H02K 5/225; H02K 5/1732; H02K 3/50; H02K 11/21; H02K 11/25; H02K 11/27
(Continued)

(56) References Cited

U.S. PATENT DOCUMENTS

2008/0309266 A1* 12/2008 Chemin ............... G01D 5/2451
318/400.02
2008/0311763 A1* 12/2008 Dubuc ................... H02K 5/225
439/18

(Continued)

FOREIGN PATENT DOCUMENTS

DE   10 2015 115 153 A1   3/2017
EP        0 650 243 A1    4/1995
(Continued)

OTHER PUBLICATIONS

FR 3069116 A1 Machine Translation (Year: 2019).*

(Continued)

*Primary Examiner* — Tran N Nguyen
*Assistant Examiner* — Masoud Vaziri
(74) *Attorney, Agent, or Firm* — Oblon, McClelland, Maier & Neustadt, L.L.P.

(57) ABSTRACT

A bearing for a rotating electric machine. The bearing includes a plastic body and at least one electrical conductor fixed to the plastic body in a non-detachable manner.

17 Claims, 4 Drawing Sheets

(51) Int. Cl.
H02K 5/173 (2006.01)
H02K 11/21 (2016.01)
H02K 11/25 (2016.01)
H02K 11/27 (2016.01)

(58) Field of Classification Search
USPC .............................................. 310/71, 89, 91
See application file for complete search history.

(56) References Cited

U.S. PATENT DOCUMENTS

| 2010/0289354 | A1 | | 11/2010 | Ishizue et al. | |
|---|---|---|---|---|---|
| 2011/0006625 | A1 | | 1/2011 | Fujii et al. | |
| 2017/0310181 | A1 | * | 10/2017 | El Baraka | ................ H02K 3/12 |
| 2018/0102686 | A1 | * | 4/2018 | Bouarroudj | ............ H02K 9/197 |
| 2019/0165633 | A1 | | 5/2019 | Gu et al. | |

FOREIGN PATENT DOCUMENTS

| FR | 3 065 335 | A1 | | 10/2018 | |
|---|---|---|---|---|---|
| FR | 3069116 | A1 | * | 1/2019 | ............. H02K 11/25 |
| KR | 10-2019-0010995 | A | | 2/2019 | |
| WO | WO 2017/084949 | A1 | | 5/2017 | |

OTHER PUBLICATIONS

Office Action issued Sep. 19, 2023, in corresponding European Patent Application No. 20 734 420.1, 7 pages.
International Search Report issued Jul. 15, 2020 in PCT/EP2020/068301filed on Jun. 29, 2020, 2 pages.

* cited by examiner

INTERCONNECTIONS, SENSORS AND CONTROL ELECTRONICS MOUNTED ON A PLASTIC BEARING OF AN ELECTRIC MACHINE

BACKGROUND

The present invention relates to a plastic bearing for a rotating electric machine.

DESCRIPTION OF THE RELATED ART

In a manner known per se, rotating electric machines comprise a stator and a rotor secured to a shaft. The rotor may be secured to a driving and/or driven shaft and may belong to a rotating electric machine in the form of an alternator, an electric motor, or a reversible machine capable of operating in both modes.

The stator is mounted in a casing that is configured so as to rotate the shaft on bearings by way of rolling bearings. The rotor comprises a body formed by a stack of laminations held in the form of a pack by way of a suitable fixing system. The rotor comprises poles formed for example by permanent magnets housed in cavities provided in the magnetic mass of the rotor. As an alternative, in an architecture known as a "salient-pole" architecture, the poles are formed by coils that are wound around arms of the rotor. As an alternative, the rotor will be formed of two pole wheels comprising claws.

Furthermore, the stator comprises a body formed by a stack of thin laminations forming a ring, the inner face of which is provided with slots that are open toward the inside in order to receive phase windings. These windings pass through the slots of the body of the stator and form bundles that protrude on either side of the body of the stator. The phase windings are obtained for example from a continuous wire that has a round or square cross section and that is covered with enamel or from pin-shaped conductive elements that are joined together by soldering.

Constraints, imposed in particular by anti-pollution standards, require limiting the mass in particular of the machine on the vehicle. However, such machines are heavy, in particular owing to the metal mass of the bearings of the casing.

The casing of the machine supports a certain number of functional devices. One of the functional devices is the interconnector, that is to say the part that provides the link between the phase windings of the stator of the machine and power electronics. The casing also supports a certain number of sensors, such as for example the temperature or position sensor.

Document FR3065338 describes for example the integration of a position sensor on the front bearing.

Installing these devices on the casing requires additional assembly steps in particular, which brings about a cost.

BRIEF SUMMARY

According to the invention, the bearing for a rotating electric machine comprises a plastic body and at least one electrical conductor fixed to the plastic body in a non-detachable manner.

By virtue of the invention, the plastic bearing that is obtained is lighter, thereby reducing the overall mass of the machine. Moreover, such a bearing into which the various functions are for example molded directly during the molding of the body of the bearing is less expensive to manufacture. The manufacturing process is in particular simplified, since the number of manufacturing steps is limited.

According to other features, on their own or in combination:
- the electrical conductor is a track that is at least partially molded into the bearing;
- the electrical conductor is a track on the surface of the bearing;
- the track is intended to connect at least a first winding end to a connection pad for connection to the power electronics of the machine or two second winding ends to one another, or a first point, connected to an element that is at the ground potential of the control electronics, to a second point, connected to an element that is at the ground potential of the motor controller;

In this case, the neutral busbar of the stator winding is integrated directly into the body of the bearing, thereby making it possible in particular to bolster the mechanical strength of the neutral busbar, to simplify the manufacturing process, and to ensure good electrical insulation.
- the track is intended to connect a first winding end to a connection pad for connection to the power electronics of the machine or two second winding ends to one another, the body comprising a molded wall surrounding the at least one connection pad;
- the body also comprises a probe of a current detection device positioned facing at least one track.

The term "facing" will be understood to mean that the probe is close to the track, at a distance allowing the current flowing in the track to be measured through the Hall effect. The distance between the probe and the track will typically be of the order of 1.5 mm.
- the body comprises a probe of a thermal unit;
- the body also comprises at least one probe of a rotor position sensor;
- at least one guide channel suitable for guiding at least one electrical connector is molded into the body of the bearing.

The invention also relates to a rotating electric machine comprising a polyphase stator surrounding a rotor mounted on a shaft extending along an axis X corresponding to the axis of rotation of the rotor and at least one bearing comprising a bearing receptacle for the rotational mounting of the shaft, and such a bearing.

The invention will be understood better from reading the following description and studying the accompanying figures. These figures are given only by way of entirely non-limiting illustration of the invention.

DETAILED DESCRIPTION

Identical, similar or analogous elements retain the same reference from one figure to another.

In the remainder of the description, a "front" element is understood to mean an element located on the drive side and a "rear" element is understood to mean an element located on the opposite side.

The description will be given in the case of a machine architecture in which the front and rear bearings are plastic bearings, each bearing incorporating certain functions.

Figure 1:
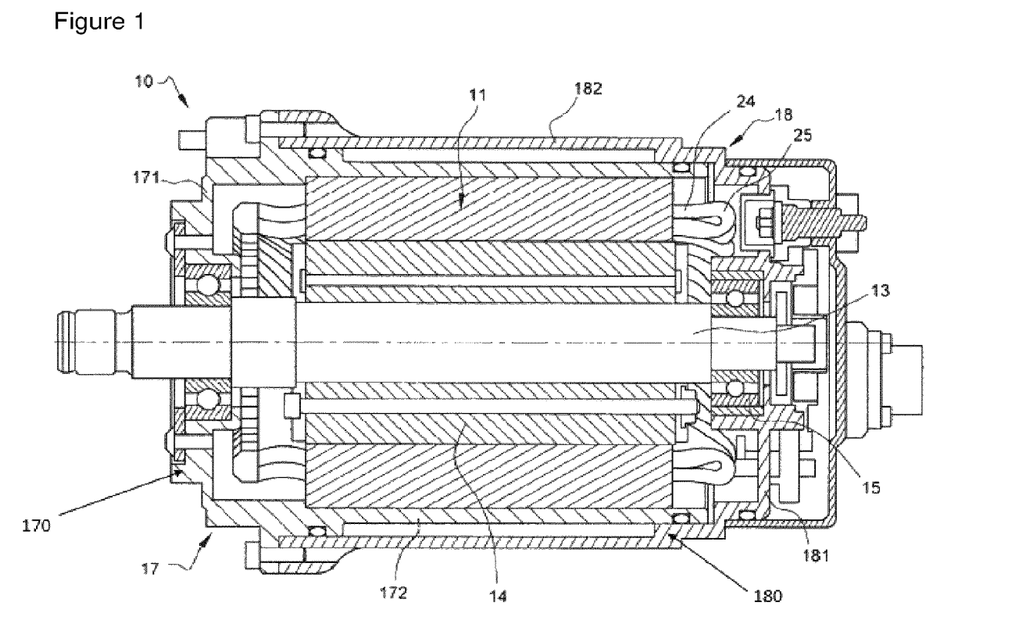
FIG. 1 is a longitudinal sectional view of a rotating electric machine according to the present invention.

FIG. 1 shows a rotating electric machine 10 comprising a polyphase stator 11 surrounding a rotor 14 mounted on a shaft 13 extending along an axis X corresponding to the axis of rotation of the rotor 14.

In the remainder of the description, the terms axial, radial, exterior and interior refer to the axis X passing through the shaft 13 at the center thereof. The axial direction corresponds to the axis X, while the radial orientations correspond to planes that are concurrent, and in particular perpendicular, to the axis X. For the radial directions, the terms exterior or interior are to be understood with respect to the same axis X, the term interior corresponding to an element oriented toward the axis, or closer to the axis than a second element, the term exterior denoting a distance from the axis.

The stator 11 surrounds the rotor 14, with an air gap being present between the inner periphery of the stator and the outer periphery of the rotor 14. The stator 11 is mounted in a casing provided with a front bearing 17 and a rear bearing 18, the two bearings each being arranged at an axial end of the stator.

The bearings 17, 18 are joined together by way of screws, called tie rods, intended to interact with threaded holes formed in protruding lugs of the bearings 17, 18 such that the stator is mounted in a manner clamped between the two bearings 17, 18.

At least one of the two bearings 17 is made of plastic. The other bearing 18 is for example metallic, for example made of aluminum. As a variant, the other bearing 18 is also made of plastic. Each bearing 17, 18 is easily obtained by molding. In the remainder of the description, it will be considered that the two bearings are made of plastic.

Each bearing comprises a body formed by a transverse flange 171, 181 and by a skirt 172, 182. The transverse flange 171, 181 extends in a plane perpendicular to the axis X1 of the bearing, intended to coincide with the axis X of the machine. The annular skirt 172, 182 originates from the outer periphery of the flange and has an axial orientation with respect to the axis X1. At least one of the bearings comprises a bearing receptacle 15 for guiding the shaft in rotation.

This electric machine 10 may for example be intended to be coupled to a gearbox belonging to a motor vehicle traction chain. The electric machine 10 is able to operate in an alternator mode in order to supply in particular energy to the battery and to the on-board power system of the vehicle, and in a motor mode, not only to start the combustion engine of the vehicle but also to contribute to providing traction to the vehicle, on its own or in combination with the combustion engine. The power of the machine 10 may be between 10 kW and 50 kW. As an alternative, the electric machine 10 may be installed on an axle of the motor vehicle, in particular a rear axle.

More specifically, the rotor 14 comprises a body in the form of a pack of laminations. Permanent magnets are installed in cavities in the body. In the example shown, the magnets are installed in a V-shaped configuration. As an alternative, the magnets are installed radially inside the cavities, the facing faces of two adjacent magnets having the same polarity. This is then a flux concentration configuration. The magnets may be made of rare earth or ferrite depending on the applications and the desired power of the machine 10.

Furthermore, the stator comprises a body formed by a pack of laminations, and also a winding 24. The body is formed by a stack of laminations that are independent of one another and held in the form of a pack by way of a suitable fixing system. The body is provided with teeth that delimit, in pairs, slots for mounting the winding of the stator.

The winding 24 comprises a set of phase windings passing through the slots and forming bundles 25 and protruding on either side of the body of the stator 11. The phase windings are obtained here from pin-shaped conductive elements, the ends of which are connected to one another, for example by soldering. As an alternative, the phase windings may be obtained from one or more continuous wires.

The phase windings may for example have a three-phase or double three-phase star or delta configuration. These windings are intended to be connected to the power portion of the electronic module. The electronic module comprises the power portion with the power bridge incorporating power elements, such as MOSFET transistors, and also an electronic control circuit for multiple detectors.

Figure 2:
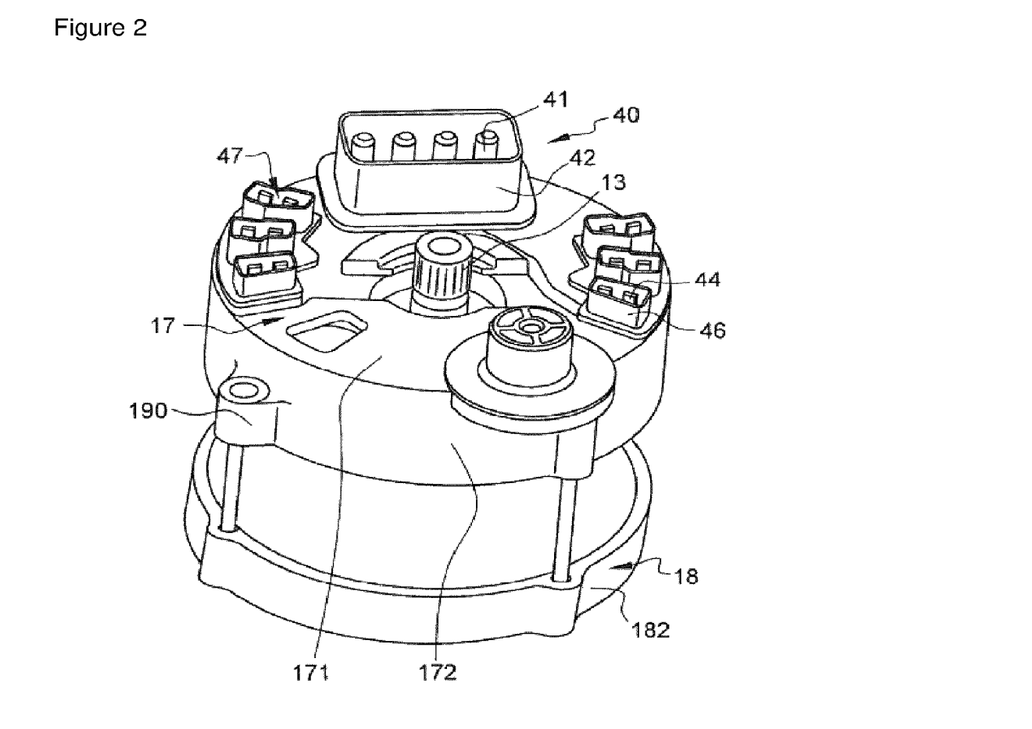
FIG. 2 is a perspective view of the machine illustrating the interface housing on the surface of the bearing.

As illustrated in FIG. 2, an interface housing 40, intended to be connected to the electronic module, is secured to the surface of the front bearing 17. The housing 40 comprises pads 41 made of conductive material, molded into the plastic bearing by way of their base. A wall 42 surrounding the pads advantageously extends from the surface of the bearing, transverse to the surface of the bearing. The wall is for example integral with the plastic bearing. The wall 42 allows the housing 40 to interact with the connection housing of the electronic module and ensures sealtightness.

Figure 3:
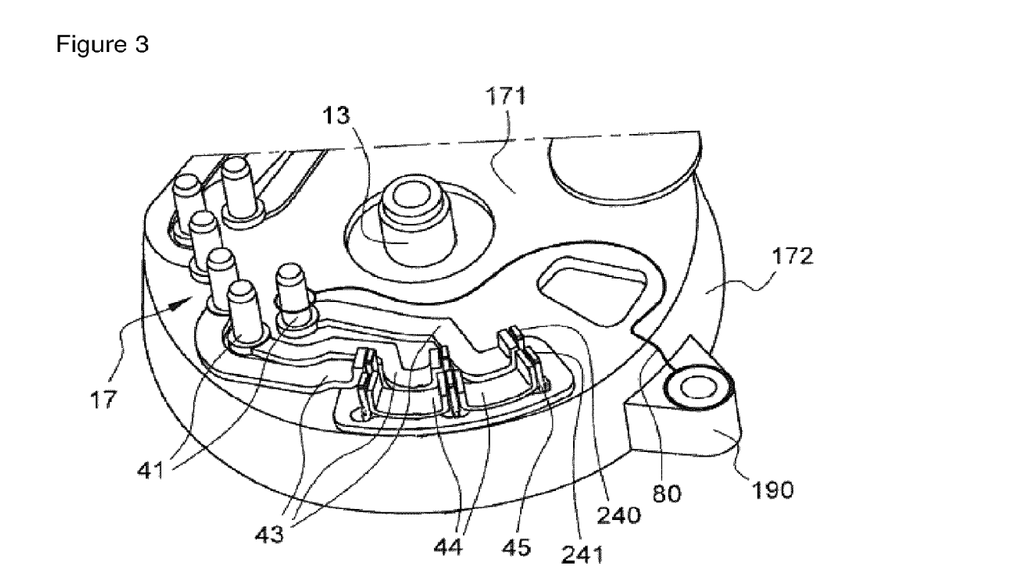
FIG. 3 is a perspective view of a bearing of the machine comprising tracks.

As illustrated in FIG. 3, conductors 43 in particular connect first ends 240 of said winding 24 to the connection pads 41 of the interface housing 40. The conductors 43 are fixed to the plastic bearing in a non-detachable manner.

The conductors 43 are advantageously tracks that are at least partially molded into the bearing. As a variant, the conductors are tracks that are obtained by painting or plastronics on the surface of the plastic bearing. The tracks formed by plastronics will in particular be the tracks for connecting grounds to one another, and therefore in which a low current flows. A first winding end 240 is for example soldered to a track.

As a variant, the first winding end 240 is screwed to the track. The track 43 is also advantageously soldered to the pad 41.

As may be seen in FIG. 3, the tracks 43 therefore make it possible to provide an electrical connection between each phase output and a pad 41 suitable for connecting it to the abovementioned power electronics module, and for connecting the neutral outputs to one another. In the three-phase case, three tracks 43 therefore respectively connect each of the first coil ends corresponding to a phase 240 to one pad 41 per phase. Other tracks 44 also make it possible to establish the electrical connections of the second coil ends 241 corresponding to neutral outputs to one another. In the three-phase case, two other tracks 44 make it possible to establish the electrical connections of the second coil ends 241 to one another.

Openings 45 are in particular provided in the transverse flange of the front bearing 171 in order to allow the stator winding ends to be connected to the tracks 43, 44 to emerge there. An opening 45 makes it possible for example to allow the two winding ends 240, 241 of a phase and of the corresponding neutral to emerge in the case of star coupling.

As illustrated in FIG. 2, the opening 45 is for example surrounded by a wall 46 designed to protect the ends of the wires emerging from this opening, thus forming a receptacle 47. The wall 46 is for example integral with the transverse flange of the plastic bearing, that is to say that the wall 46 is formed in one piece with the flange. The walls are advantageously directly molded during the molding of the bearing.

In the case of an oil-cooled machine in particular, the non-insulated winding ends have to be protected against oil infiltration. In this case, the receptacles 47 are advantageously filled with resin in order to protect the winding ends. As a variant, a single opening 45 may be provided for all the winding outputs of a three-phase system for example, the wall 46 surrounding this opening and resin being able to be used to fill the receptacle thus formed so as to protect the winding ends. As a variant, each receptacle thus formed by the wall may be closed off by a cover, mounted in a sealed manner on said wall 46.

Tracks may also be provided in order to interconnect a first point, connected to an element that is at the ground potential of the control electronics, to a second point, connected to an element that is at the ground potential of the motor controller. The ground potential of the control electronics is recovered at one of the phase pads 41 of the interface housing. The ground potential of the motor controller is recovered at fixing holes 190 at which the casing is fixed to the vehicle. The ground is for example in this case 12 V.

Figure 4:
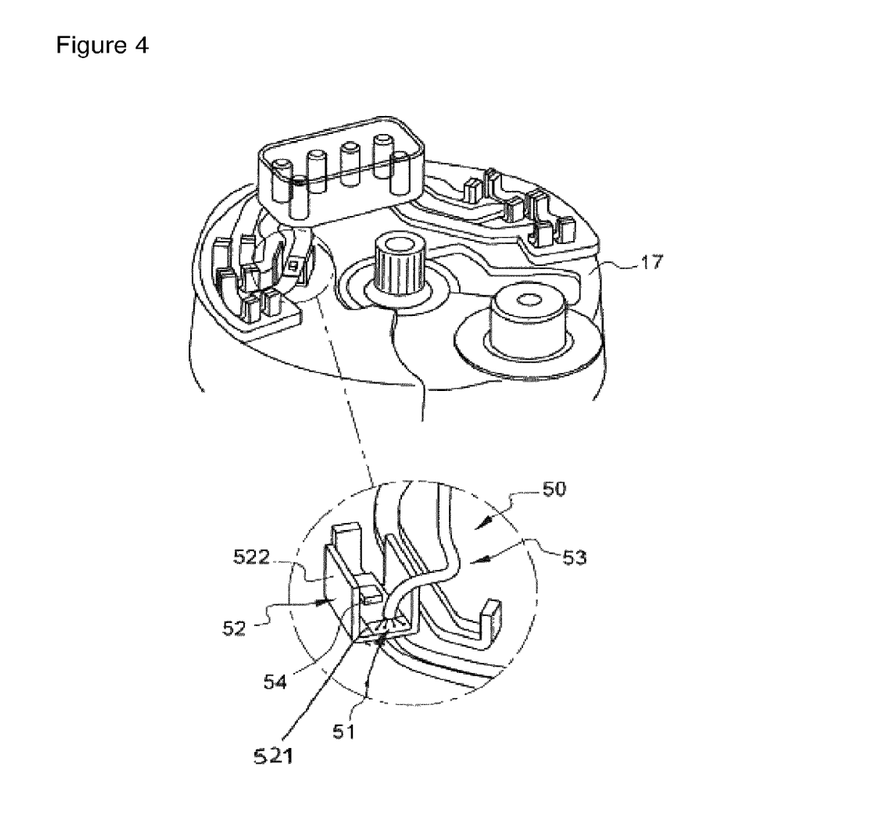
FIG. 4 is a perspective view of a bearing comprising a probe of a current detection device.

The bearing 17 comprises a probe 51 of a current detection device 50, illustrated in FIG. 4, for measuring a current flowing in the power track. The probe is therefore at least partially molded into the body of the plastic bearing. The probe 51 is for example a magnetic field probe. The magnetic field probe may be a Hall effect probe, which has the advantage of being compact, of consuming little power and of supplying a signal that is insensitive to noise. In the embodiment of FIG. 4, the probe 51 is mounted facing the power track. More precisely, the probe is positioned facing a portion of the track.

As may be clearly seen in FIG. 4, a ferromagnetic shield 52 makes it possible to reduce magnetic interference liable to influence the measurement carried out by the probe. The ferromagnetic shield 52 consists of a U-shaped part having a bottom wall 521 from which two end walls 522 originate. The bottom wall 521 has a face in contact with the face of the track opposite the one carrying the probe 51. The end walls 522 extend on either side of the probe 51. The end walls 522 extend substantially perpendicular to the bottom 521 and to the portion of the track carrying the probe. The width of the U of the shield 52, corresponding to the distance between the end walls 522, is substantially equal to the width of the power track.

The probe 51 is associated with a connector 53 that is provided with a plurality of connection pins. Two of the pins are intended to supply power to the probe 51, and at least one pin is intended to transport a signal relating to the measurement performed by the probe.

The probe 51 and the connector 53 are mounted on an integrated circuit 54, which is pressed against the portion of the power track. The integrated circuit may be rigid or flexible. The connector 53 is connected to the control unit for the control electronics via a connection cable, as illustrated in FIG. 4. As a variant, the connector is connected to the control electronics for example by overmolded tracks (not illustrated).

As illustrated in FIG. 4, the track 43 and also at least part of the shield 52 and the integrated circuit 54 are overmolded into the plastic bearing, defining a cavity in which the probe 51 is located. In order to prevent dust, liquid or other dirt from penetrating into the measurement area, the cavity is hermetically closed off by a cover. As a variant, the cavity is filled with a resin material.

Figure 5A:
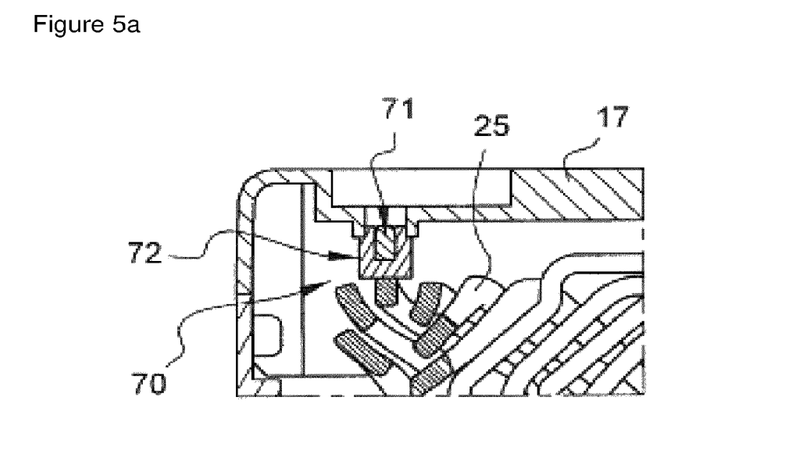
FIG. 5a is a sectional view of part of the machine equipped with a thermal detection unit.

Moreover, in order to protect the electric machine in the event of overheating, this machine is equipped with a thermal detection unit 70, illustrated in FIG. 5a. This unit is intended to be connected, via at least one conductor 73, to a thermal protection circuit (not shown) configured so as to reduce or cut off the electric power supply to the machine upon detection of overheating.

Figure 5B:
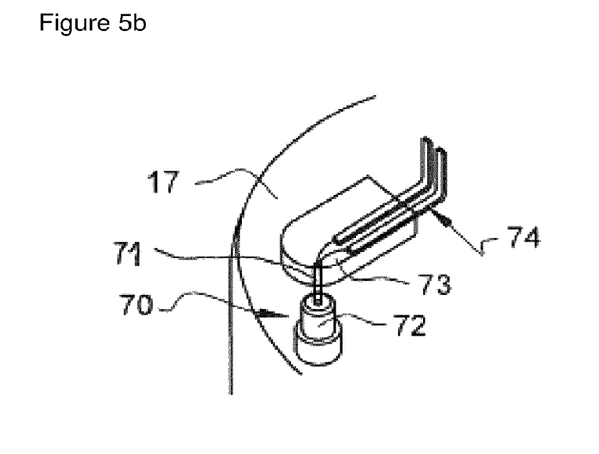
FIG. 5b is a perspective view of the thermal detection unit with which the machine is equipped.

More precisely, use is made of a temperature sensor 71 (visible in particular in FIG. 5b) secured to an elastic support 72 for fixing to the front bearing 17 of the rotating electric machine. The temperature probe 71 will in particular be a glass-encapsulated thermistor. The fixing support 72 will in particular be a flexible portion, such as a compressible sheath. The sheath will for example be a silicone sheath. As a variant, it will be a rubber or resin sheath with elastic properties. The probe 71 emerges at both ends of the sheath.

Part of the sheath is overmolded into the front plastic bearing 17, such that the two ends of the probe emerge on either side of the wall of the plastic bearing. In one embodiment, the elastic sheath is overmolded on the periphery of an opening of the bearing beforehand, and then the temperature probe is inserted into the sheath. As a variant, the probe is integrated in the compressible sheath beforehand, and then the whole assembly is molded into the bearing.

The conductors 73, for example wires, connected to the end of the probe 71 are guided along the surface of the front bearing 17. In one preferred embodiment, connection tabs 74 make it possible to connect the wires to the thermal protection circuit. The conductive tabs 74 are for example tracks on the surface of the front bearing 17. The ends of the wires are connected to the conductive tabs 74, in particular by soldering. Resin is advantageously used to cover the join between the conductive tabs 74 and the wires 73, in order to prevent them from being damaged.

The sheath 72 protrudes toward the winding bundle 25, and is intended to come into local contact with the bundle 25 in question of the winding of the stator. The sheath is made of a material resistant to the heat transmitted by the bundle 25 of the winding. It ensures a good thermal transfer between the probe 71 and the bundle 25 in question of the winding. This sheath is electrically insulating. The inner face of this sheath has a larger area of contact with the bundle than the area of direct contact between the probe 71 and the bundle 25, as may be seen in FIG. 5b. The sheath ensures the sealing and electrical insulation of the probe 71 and of the end of the one or more connectors 73, which end may be exposed. The probe 71 is in contact with the winding bundle 25 through the spring effect of the support 72.

As a variant, if the plastic is not electrically conductive, the probe may be partially molded directly into the plastic bearing, in particular in order to measure the ambient temperature of the machine. In this case, the probe is not encapsulated in a conductive sheath. The probe extends between two ends, the side wall of the probe being molded into the plastic bearing, the probe therefore emerging on either side of the transverse flange of the plastic bearing.

Figure 6A:
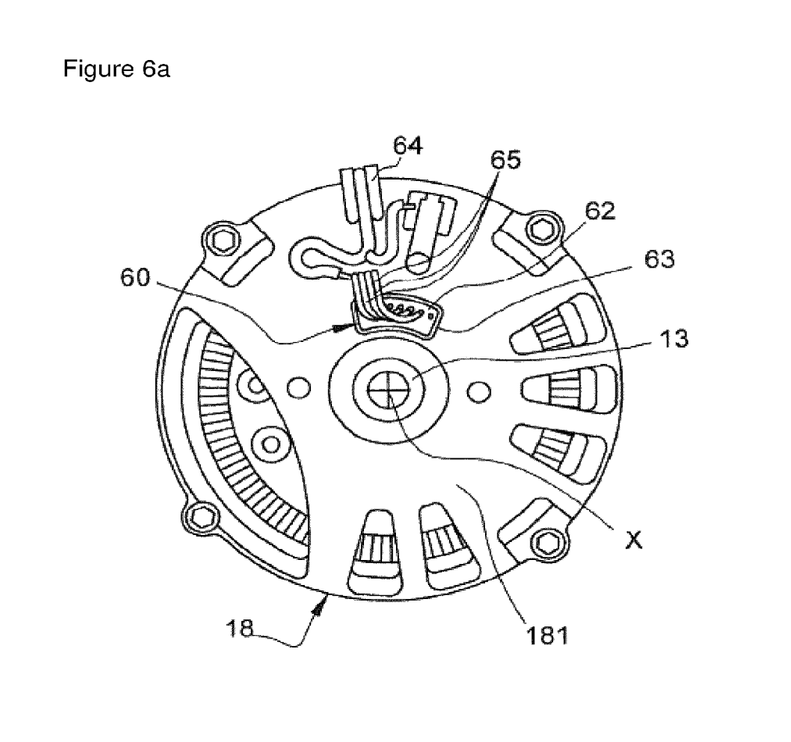
FIG. 6a is a plan view of a bearing equipped with a rotor position sensor.

As illustrated in FIG. 6a, the rear bearing 18 also in particular comprises probes 61 of a rotor position sensor 60. The position sensor in particular detects the angular position of the rotor. The position sensor is in particular of the axial readout type.

Figure 6B:
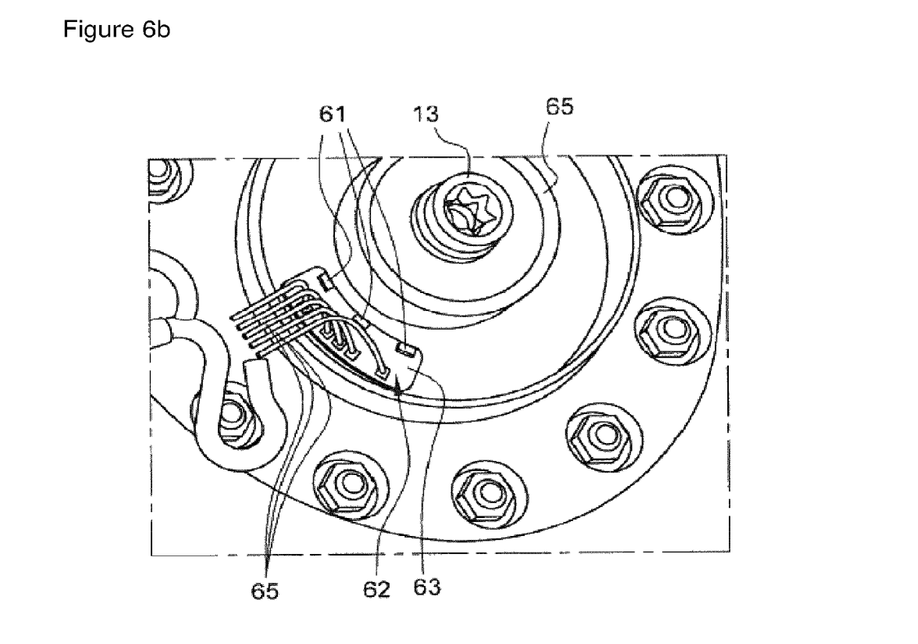
FIG. 6b is a perspective view of part of the bearing carrying the position sensor.

This sensor 60, which may be seen in FIG. 6b, comprises a target washer 65 mounted around the shaft 13. The washer 65 extends in a plane perpendicular to the axis of rotation X of the rotor.

The magnetic field measurement probes 61 are arranged so as to measure the magnetic field generated by the target washer 65 along the direction of the axis of rotation X of the rotor. In this case, use is made of three probes 61 that are angularly offset from one another in a regular manner. The probes 61 are advantageously Hall effect probes. As a variant, the probes 61 are eddy current probes.

The magnetic field measurement probes 61 are mounted on the surface of a printed circuit 62, as shown in FIG. 6b. The printed circuit 62 is mounted on a support 63. The support 63, for example made of plastic, is secured to the stator 11 such that the probes 61 face the target washer 65.

The probes 61 are connected to a control unit for the control electronics, for example by wired connectors 65 going from the printed circuit 62 to the electronics. The support 63 on which the printed circuit 62 is mounted is overmolded into the plastic bearing 18 such that the probes 61 are unobstructed facing the washer, the wired connectors 65 emerging from the bearing toward the electronics. As a variant, some of the connectors 65 to the control electronics are tracks overmolded into the bearing (not shown).

Thus, during operation, the rotation of the rotor causes the magnetic field received by the various probes 61 to vary. These probes 61 transmit electrical signals to the control unit, these being dependent on the received magnetic field levels. The control unit processes these signals so as to deduce therefrom the speed and also the position of the rotor.

Integrating the position sensor 60 into the rear plastic bearing 18 makes it possible to reduce the number of parts, to improve and to simplify the fixing of said position sensor on the machine, and allows the sensor not to rotate during any thermal variations.

In one preferred embodiment, the transverse flange of the rear bearing 181 may in particular comprise at least one guide channel 64 suitable for guiding at least one electrical connector 65 connecting the probes 61 to the control unit, as illustrated in FIG. 6a. The guide channel 64 is for example delimited by two beads of plastic that are molded during the molding of the bearing at the transverse flange 181 and potentially extending onto the annular skirt 182 for guidance purposes.

Of course, the above description has been given only by way of example and does not limit the field of the invention, which would not be departed from by replacing the various elements with any other equivalents.

Moreover, the various features, variants and/or embodiments of the present invention may be combined with one another in many combinations, as long as they are not mutually incompatible or mutually exclusive.

This description may in particular be applied to a claw rotor machine in which for example the pinion will be replaced by a pulley.

The invention claimed is:

1. A bearing for a rotating electric machine, comprising: a plastic body; and
at least one electrical conductor fixed to the plastic body in a non-detachable manner,
wherein the electrical conductor is a track that is at least partially molded into the bearing,
wherein the track is configured to connect:
at least one first winding end to a connection pad for connection to power electronics of the machine or two second winding ends to one another,
or a first point, connected to an element that is at the ground potential of control electronics, to a second point, connected to an element that is at the ground potential of a motor controller, and
wherein the plastic body further comprises a probe of a current detection device positioned facing at least one track.

2. The bearing as claimed in claim 1, wherein the electrical conductor is a track on the surface of the bearing.

3. The bearing as claimed in claim 1, wherein the track is intended to connect a first winding end to a connection pad for connection to the power electronics of the machine or two second winding ends to one another, the body comprising a molded wall surrounding the at least one connection pad.

4. The bearing as claimed in claim 1, whose body comprises a probe of a thermal unit.

5. The bearing as claimed in claim 1, whose body also comprises at least one probe of a rotor position sensor.

6. The bearing as claimed in claim 1, into the body of which is molded at least one guide channel suitable for guiding at least one electrical connector.

7. A rotating electric machine comprising a polyphase stator surrounding a rotor mounted on a shaft extending along an axis X corresponding to the axis of rotation of the rotor and at least one bearing comprising a bearing receptacle for the rotational mounting of the shaft, the bearing being as claimed in claim 1.

8. The bearing as claimed in claim 2, wherein the track is intended to connect:
at least one first winding end to a connection pad for connection to power electronics of the machine or two second winding ends to one another,
or a first point, connected to an element that is at the ground potential of control electronics, to a second point, connected to an element that is at the ground potential of a motor controller.

9. The bearing as claimed in claim 1, whose body comprises a probe of a thermal unit.

10. The bearing as claimed in claim 1, whose body also comprises at least one probe of a rotor position sensor.

11. The bearing as claimed in claim 1, into the body of which is molded at least one guide channel suitable for guiding at least one electrical connector.

12. A rotating electric machine comprising a polyphase stator surrounding a rotor mounted on a shaft extending along an axis X corresponding to the axis of rotation of the rotor and at least one bearing comprising a bearing receptacle for the rotational mounting of the shaft, the bearing being as claimed in claim 1.

13. The bearing as claimed in claim 2, whose body also comprises a probe of a current detection device positioned facing at least one track.

14. The bearing as claimed in claim 2, whose body comprises a probe of a thermal unit.

15. The bearing as claimed in claim 2, whose body also comprises at least one probe of a rotor position sensor.

16. The bearing as claimed in claim 2, into the body of which is molded at least one guide channel suitable for guiding at least one electrical connector.

17. A bearing for a rotating electric machine, comprising:
a plastic body; and
at least one electrical conductor fixed to the plastic body in a non-detachable manner,
wherein the electrical conductor is a track on the surface of the bearing,
wherein the track is configured to connect:
at least one first winding end to a connection pad for connection to power electronics of the machine or two second winding ends to one another,
or a first point, connected to an element that is at the ground potential of control electronics, to a second point, connected to an element that is at the ground potential of a motor controller, and
wherein the plastic body further comprises a probe of a current detection device positioned facing at least one track.

\* \* \* \* \*